(12) United States Patent
Xu et al.

(10) Patent No.: US 9,179,144 B2
(45) Date of Patent: Nov. 3, 2015

(54) FAST SWITCHING HYBRID VIDEO DECODER

(71) Applicant: Cisco Technology, Inc., San Jose, CA (US)

(72) Inventors: Guang Xu, HeFei (CN); Hongjuan Wang, Hangzhou (CN); Qi Zhang, Hangzhou (CN); Zhiliang Wang, HeFei (CN)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 13/687,069

(22) Filed: Nov. 28, 2012

(65) Prior Publication Data

US 2014/0146895 A1    May 29, 2014

(51) Int. Cl.
*H04N 7/26* (2006.01)
*H04N 19/44* (2014.01)
*H04N 19/42* (2014.01)

(52) U.S. Cl.
CPC ......... *H04N 19/00533* (2013.01); *H04N 19/42* (2014.11); *H04N 19/44* (2014.11)

(58) Field of Classification Search
CPC ............................... H04N 19/42; H04N 19/44
USPC .................................................... 375/240.25
See application file for complete search history.

(56) References Cited

U.S. PATENT DOCUMENTS

| | | | |
|---|---|---|---|
| 6,901,153 B1 | 5/2005 | Leone | |
| 6,965,641 B1* | 11/2005 | Gulati et al. | 375/240.01 |
| 8,270,495 B2 | 9/2012 | Chou et al. | |
| 2004/0193289 A1* | 9/2004 | Chen et al. | 700/3 |
| 2005/0053157 A1* | 3/2005 | Lillevold | 375/240.25 |
| 2005/0094729 A1* | 5/2005 | Yuan et al. | 375/240.16 |
| 2007/0041444 A1* | 2/2007 | Gutierrez Novelo | 375/240.15 |
| 2007/0274679 A1* | 11/2007 | Yahata et al. | 386/69 |
| 2010/0128778 A1* | 5/2010 | Ji et al. | 375/240.2 |
| 2010/0208828 A1* | 8/2010 | Lu et al. | 375/240.25 |
| 2012/0087415 A1* | 4/2012 | Rabii | 375/240.25 |

OTHER PUBLICATIONS

Wang, et al., "Architecture for Real-time HDTV Video Decoding," Tamkang Journal of Science and Engineering, vol. 2, No. 2, pp. 53-60, 2009.
Sullivan, et al., "DirectX Video Acceleration Specification of Off-Host VLD Mode for MPEG-4 Part 2 Video Decoding," Microsoft Corporation, pp. 1-22, Mar. 2011.
ISO/IEC 14496-15, "Information technology—Coding of audio-visual objects—Part 15: Advanced Video Coding (AVC) file format," International Standard, Apr. 15, 2004.

* cited by examiner

*Primary Examiner* — Jay Patel
*Assistant Examiner* — Francis G Geroleo
(74) *Attorney, Agent, or Firm* — Edell, Shapiro & Finnan, LLC

(57) ABSTRACT

Techniques are presented herein for switching between a software decoder and a hardware decoder in a hybrid decoder. A video bit stream is received. The video bit stream is analyzed to determine whether or not the video bit stream can be decoded by the hardware decoder. When the video bit stream can be decoded by the hardware decoder, the video bit stream is routed to the hardware decoder and also stored in a first buffer. The video bit stream is decoded by the hardware decoder and when a reference frame is decoded, the reference frame is stored in a second buffer. When the video bit stream cannot be decoded by the hardware decoder, the video bit stream is routed to the software decoder for decoding. When an instantaneous decoder refresh (IDR) frame is decoded by the software decoder, the IDR frame is stored in the first buffer.

18 Claims, 6 Drawing Sheets

FAST SWITCHING HYBRID VIDEO DECODER

TECHNICAL FIELD

The present disclosure relates to video decoders.

BACKGROUND

Many microprocessors use a hardware accelerator to perform coding for video encoding and decoding. The hardware accelerator, however, is fixed to a particular coding and decoding (codec) standard and cannot be used for new codec standards and certain abstractions from the codec, e.g., variations provided by a Network Abstraction Layer (NAL) that are used to provide variable bandwidth and network customization options under the International Telecommunication Union Telecommunications standardization sector (ITU-T) H.264 advanced video codec (AVC) standard. The AVC standard is defined, in part, in Motion Pictures Expert Group version 4 (MPEG-4), part 10. As a result, some coding tasks for network abstraction can not be performed in hardware, and in many instances can be performed in software.

In general, codecs implemented using an Application Specific Integrated Circuit (ASIC) are faster and more energy efficient than codecs implemented in software and executed on a central processing unit (CPU). For example, many chip manufacturers provide H.264 AVC hardware decoding units as part of a graphics processing unit (GPU). To facilitate hardware decoding, several public application programming interfaces (APIs) have been provided by hardware manufacturers and software Operating System (OS) providers, e.g., DirectX Video Acceleration (DXVA) is provided by Microsoft Corporation while Video Decode Acceleration Framework (VDA) is supplied by Apple, Inc. For royalty-free mobile platforms, OMX™ Integration Layer (IL) is provided by the Khronos Group. The above mentioned APIs can be used by setting decoder parameters or by sending NAL data to the hardware decoding unit. The hardware decoding unit preprocesses the video bit stream along with API calls. However, in many circumstances the hardware decoding unit will fail during NAL processing thereby resulting in a poor user experience.

DESCRIPTION OF EXAMPLE EMBODIMENTS

Overview

Figure 1:
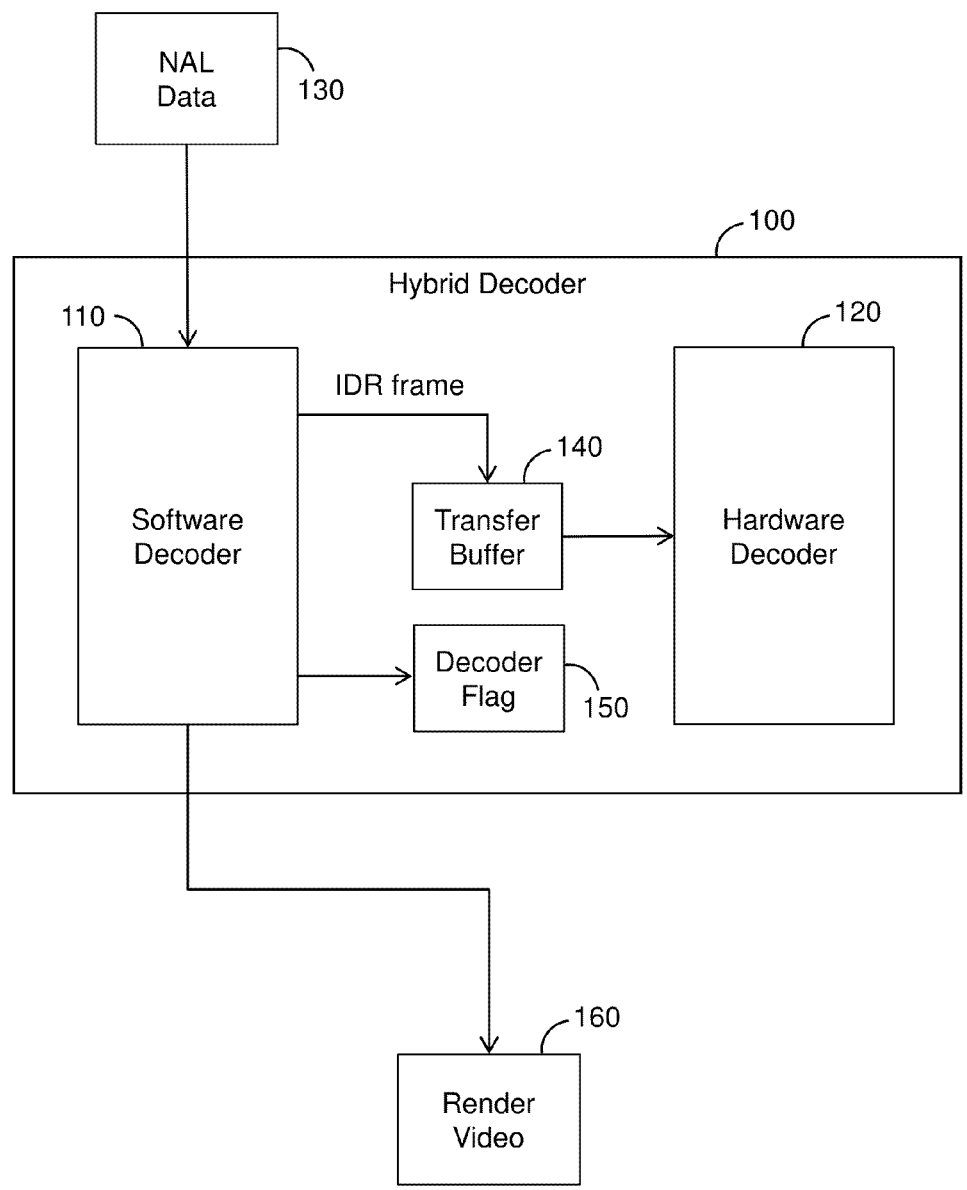
FIGS. 1 and 2 are example block diagrams of a hybrid decoder having a hardware and a software decoder, and which is configured to perform fast switching between the hardware decoder and software decoder in response to conditions of a received bit stream according to the techniques described herein.

Techniques are provided herein for fast switching in a hybrid video decoder having a hardware decoder and a software decoder. A video bit stream is received at the hybrid decoder. The video bit stream is analyzed to determine whether or not the video bit stream can be decoded by the hardware decoder. When the video bit stream can be decoded by the hardware decoder, the video bit stream is routed to the hardware decoder and also stored in a first buffer. The video bit stream is decoded by the hardware decoder and when a reference frame is decoded, the reference frame is stored in a second buffer. When it is determined that the video bit stream can not be decoded by the hardware decoder, the video bit stream is routed to the software decoder and decoded by the software decoder. When an instantaneous decoder refresh (IDR) frame is decoded by the software decoder, the IDR frame is stored in the first buffer. The use of the first and second buffers to store the requisite data allows the hybrid decoder to rapidly switch between the software and hardware decoders based on the contents of the received video bit stream. These techniques may be embodied in apparatus form, as well as in the form of a computer readable media storing instructions that when executed by a processor, cause the processor to perform operations described herein.

Example Embodiments

When using a NAL, e.g., an H.264 NAL, enhanced coding efficiency can be obtained in a variety of network environments, e.g., cable television, video over Internet Protocol (IP), Digital Subscriber Line (DSL), satellite, digital storage, wireless Long Term Evolution (LTE) networks, and the like. The enhanced coding efficiency becomes more beneficial as the transmission bandwidth decreases. A NAL facilitates this by formatting a Video Coding Layer (VCL) representation of the video, along with header information to accommodate the network transport layer that ultimately terminates, e.g., at a user video device or interim storage device. In other words, NAL, among other functions, maps video to the transport layer.

NAL processed video is transmitted in NAL units having a header and a video payload. As such, NAL units can be used for packet or bit stream transport, generically referred to herein as a bit stream. When NAL streaming is employed, a sliding or other correlator is employed with known bit patterns that define a NAL boundary. For NAL packet based transport, e.g., IP or Real-time Transport Protocol (RTP), the packets or headers are used to delineate NAL boundaries. Most of the transported data are VCL units such as sampled video, video slices, or macroblocks, while non-VCL data is used to transport parameters and enhancement data (timing) that are not sampled video.

Parameters or parameter sets carried in non-VCL units may apply to a single coded picture or a sequence of coded pictures, e.g., a larger number of NAL units. Accordingly, the non-VCL units decouple slowly changing information, e.g., encoding type, from more rapidly changing information, e.g., the video itself. By way of example, the non-VCL units may indicate that the video is Phase Alternating Line (PAL) coded using context-adaptive variable-length coding (CAVLC) format or context-based binary arithmetic coding (CABAC) format.

A set of NAL units in a specified form, e.g., specified using non-VCL units, is referred to as an Access Unit (AU). AUs are a set of NAL units that form a complete picture, e.g., a single viewable picture in a video sequence. For example, a set of video slices or VCL NAL units that form a single full screen of video is an AU. AUs may consist of base or intra coded pictures, or inter coded pictures. Intra coded pictures can be decoded without decoding any other picture, while inter coded pictures are predicted from other intra or inter coded pictures, i.e., intra pictures are self-contained, while inter pictures need another decoded picture to predict from, e.g., for motion prediction. In the context of NALs, decoded intra pictures may be considered IDR pictures or frames. Furthermore, since intra pictures are complete in and of themselves, they are commonly used as reference pictures for motion prediction.

By virtue of the NAL and other encoding parameters to be described later, video reaching a hardware decoder may have issues that prevent the decoder from fully rendering decoded video at the receiving endpoint. According to the techniques described herein, hardware decoder deficiencies can be compensated for by using a hybrid decoder that "fast" switches the video bit stream between the hardware decoder and a software decoder, as necessary. However, switching from a hardware decoder to a software decoder requires a finite amount of time that may disrupt video presented to a user. Briefly, the techniques presented herein minimize video disruption to the user, whether by switching from hardware to software decoders, or vice versa, by employing a storage buffer. Further, the ability to "switch" between decoders with minimal disruption to the user experience is achieved by the techniques presented herein.

Referring first to FIG. 1, an example block diagram is shown for a hybrid decoder 100 having a software decoder 110 and a hardware decoder 120. The hybrid decoder 100 may comprise a CPU, e.g., a digital signal processor (DSP) and an on or off chip hardware encoder-decoder (ECD) that is described hereinafter in connection with FIG. 3. The hybrid decoder 100 has a transfer buffer 140 and a decoder switch or flag 150. As shown, NAL data 130 is received by hybrid decoder 100, decoded, and output as rendered video at 160.

The decoder flag 160 is, for example, a binary state machine, bit, or switch that indicates whether NAL data 130 is to be decoded by software decoder 110 or hardware decoder 120. When acting as a switch, decoder flag 150 switches NAL data 130 between software decoder 110 and hardware decoder 120. Conceptually, a binary state machine has two states, e.g. 0 or 1, true or false, or on or off. FIG. 1 depicts a state in which NAL data 130 are decoded software decoder 110, while FIG. 2 (described hereinafter) depicts a state in which NAL data 130 are decoded by hardware decoder 120. The assignment of states can be a matter of design or ease of implementation, e.g., 0 indicates "use software decoder" 110 while 1 indicates "use hardware decoder 120," or vice versa.

In the example shown in FIG. 1, NAL data 130 are decoded by software decoder 110 and sent to a video rendering device. At the same time, when a new IDR frame is obtained, it is stored in transfer buffer 140. As mentioned above, hybrid decoder 100 is preferentially operated using hardware decoder 120 because a hardware decoder is generally faster and more energy efficient than a software decoder. To this end, software decoder 110 or another component monitors NAL data 130 to determine if and when NAL data 130 can be switched to hardware decoder 120. If NAL data 130 can be switched to hardware decoder 120, then software decoder 110 signals decoder flag 150 to switch states. By virtue of the IDR frame or frames stored in transfer buffer 140, hardware decoder 120 can immediately start to decode any NAL data that it receives. This is one technique for "fast" switching from a software decoder to a hardware decoder.

Figure 2:
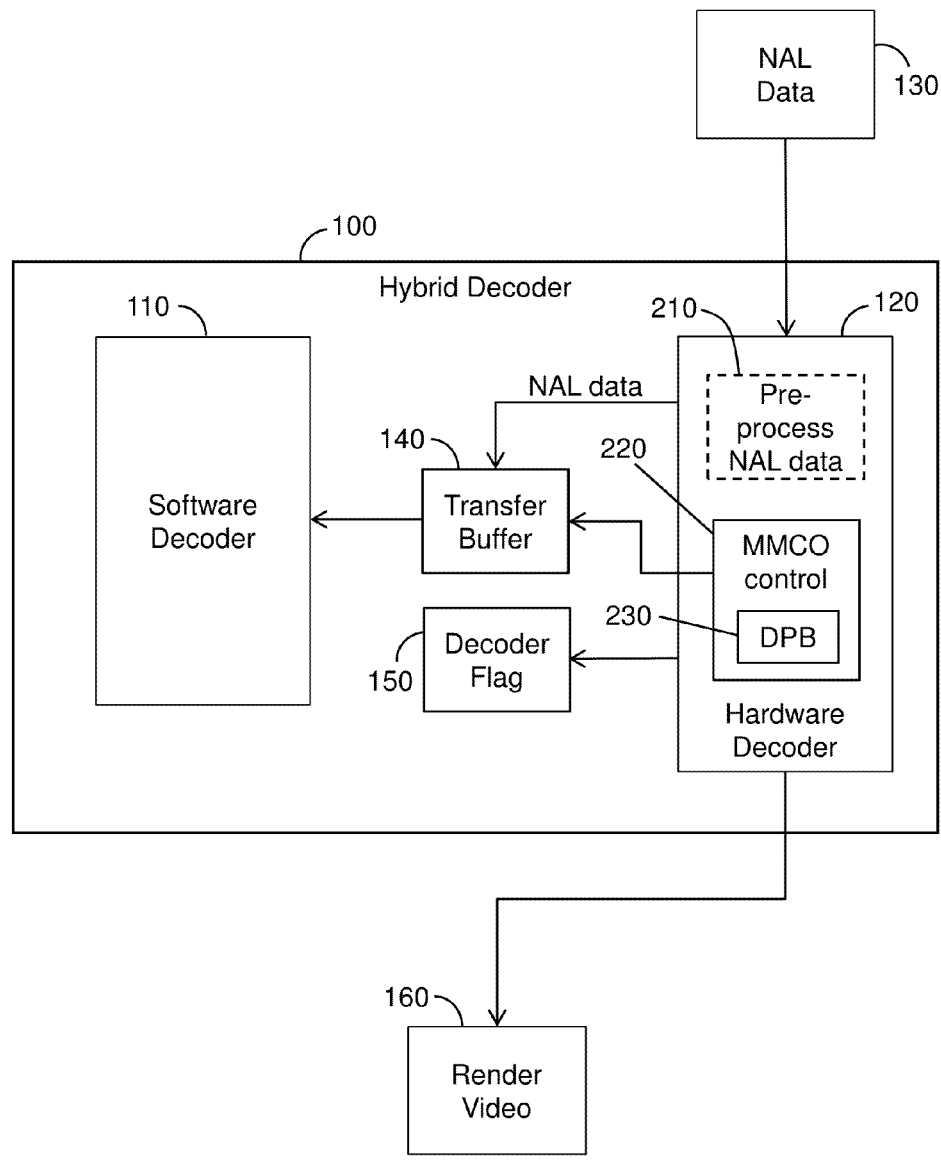

Turning now to FIG. 2, hybrid decoder 100 from FIG. 1 is shown again, but in this figure, decoder flag 150 is set to the hardware decode state or mode, and NAL data 130 are routed to hardware decoder 120. In addition, the hardware decoder 120 has an NAL data preprocessor 210, a memory management control operation (MMCO) 220, and a decode picture buffer (DPB) 230. Hardware decoder 120 decodes NAL data 130 for rendering, e.g., at a video device 160. At the same time, NAL data 130 are stored in transfer buffer 140, should switching to the software decoder occur. When a new reference frame is decoded, it is stored by MMCO 220, in DPB 230. Thus, when switching to the software decoder, the previously stored NAL data can be merged with the NAL data being received. Furthermore, by transferring one or more reference frames from DPB 230 to the software decoder 110, seamless, near real-time, decoding of the NAL data is performed by the software decoder.

NAL data preprocessor 210 is largely a software function, as indicated by the dashed box. NAL data preprocessor 210 preprocesses NAL data 130 in order to determine if any decoding problems may occur when NAL data 130 are eventually decoded by hardware decoder 120. If and when preprocessor 210 determines that a hardware decoder error will occur, hardware decoder 110 or other component signals decoder flag 150 to switch states to decode NAL data by a software decoder, e.g., software decoder 110. If a potential error is not detected by NAL data preprocessor 210, the NAL data 130 are forwarded for hardware decoder API calls.

While hardware decoding may be preferred, switching to software decoding can preserve video rendering for the end user. As mentioned above, by storing NAL data in a transfer buffer and storing reference frames in a DPB, software decoder 110 can immediately start to decode any NAL data that it receives. This constitutes another technique for fast switching from a hardware decoder to a software decoder. The DPB may be part of a memory that may be stand-alone or part of a processor memory. Reference frames may be, e.g., IDR, intra, or other inter reference frames. Transfer buffer 140 or DPB 230 may be implemented, e.g., as a buffer pool, a first-in first-out (FIFO) or circular buffer for storing video bits streams, reference frames, IDR frames, and the like.

Note that in a real-time application, absent a transfer buffer or DPB, either of the decoders has to request and wait for an IDR frame to begin any decoding sequence, thereby delaying video to the end user. The delay is a function of the condition and bandwidth of the transport network. By using the transfer buffer and DPB, switching is faster than waiting for an IDR frame from the network in real-time.

Preprocessing of a bit stream may include parsing the video bit stream. MMCO commands may be recorded during parsing. MMCO commands are inserted by the encoder in order for the decoder to manage decoded pictures. When a decoded result from the hardware API indicates that a reference frame has been decoded, the reference frame is stored in the DPB 230 and managed by MMCO 220. The decoded results in stored DPB 230 are prepared data that can be used to switch to the software decoder.

When in the hardware decoding mode, e.g., as indicated by decoder flag 150, the hardware decoder parses NAL data for limitations in each NAL AU. If the NAL data were not checked and an unsupported bit stream is sent to the hardware encoder, decoding will result in an error or decoder crash. A hardware decoder error or failure may not be acceptable in certain products or applications. The parameters that are used for checking NAL data limitations can be chosen by the design engineer based on the code in use, e.g., AVC or SVC encoding syntax. When in the software decoding mode, e.g., as indicated by decoder flag 150, and no limitations are found in the NAL data, the AU type is for each received frame is checked to see if an IDR frame has been received. Once the IDR frame is received, a switch to the hardware decoder can be made. In some applications, the initial NAL data parsing should be performed in the software mode since it is presumed that the software decoder can otherwise decode a bit stream with a hardware decoder limitation.

Figure 3:
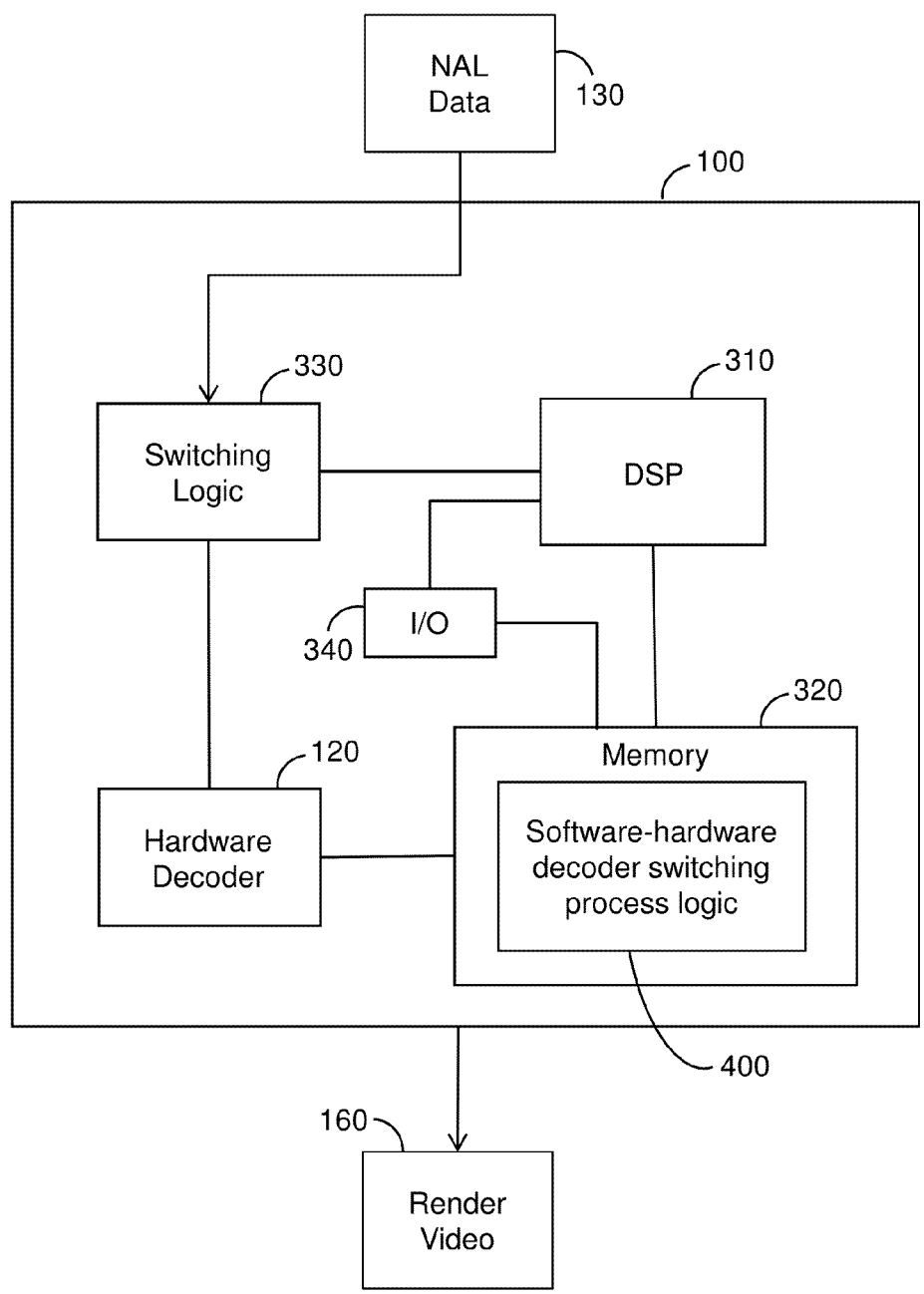
FIG. 3 is an example hardware diagram of a hybrid decoder configured to perform fast switching according to the techniques described herein.

Referring to FIG. 3, an apparatus, e.g., hybrid decoder 100, for decoding a video sequence or bit stream is shown. Hybrid decoder 100 comprises hardware decoder 120, e.g., a logic device such as an ASIC or field programmable gate array (FPGA), and a software decoder, e.g., software decoder 110, illustrated as a processing device 310, e.g., a DSP, and memory 320. The hardware decoder 120 and the DSP 310 may be connected to a network interface or input/output (I/O) device 340 for reception and transmission of video, NAL data, and the like. Hybrid decoder 100 has switching logic 330 for switching data, e.g., NAL data 130, between the hardware decoder 120 and DSP 310. Memory 320 stores software-hardware decoder switching process logic 400 for performing NAL data analysis and signaling to determine when switching logic 330 should switch between hardware and software decoder functions. Process logic software-hardware decoder switching process logic 400 may be referred to herein simply as process 400. Process 400 is described in greater detail in connection with FIGS. 4a, 4b, and 4c.

Switching logic 330 may be a separate switch with switch signaling, or a bit in a memory or register that either performs actual data switching, or signals I/O 340 to route NAL data 130 to the appropriate software or hardware decoder. Any suitable switching mechanism or data bus logic may be employed, and switching logic 330 is an example of how NAL data switching between a hardware decoder and software may be performed. It should be understood that the various signal paths shown between the components in FIG. 3 are simplified for ease of illustration, and that many signal pathways and supporting electronic components are not shown.

The processing functions shown in FIG. 3, including process 400, may be implemented by logic encoded in one or more tangible computer readable (non-transitory) media or memory device (e.g., embedded logic such as an ASIC, DSP instructions, software that is executed by a processor, etc.), e.g., memory 320. Thus, the processing functions of the hardware decoder 120 or DSP 310 in combination with memory 320 may be implemented with fixed logic or programmable logic (e.g., a programmable processor, programmable digital logic (e.g., an FPGA) or an ASIC that comprises fixed digital logic, or a combination thereof. The memory 320 may be separate or part of the DSP 310 or hardware decoder 120, or a combination thereof. The memory 320 may be used to buffer bit streams as described above, and store various instructions and data, including IDR frames and reference frames, as mentioned above. Various buffers may be employed or a memory sharing scheme may be used when memory may be limited. Thus, in one form, the techniques described herein may be embodied by one or more computer readable storage media encoded with software comprising computer executable instructions and when the software is executed operable to perform the operations described herein.

The DSP 310 comprises a CPU and may comprise hardware decoder 120, e.g., a hardware ECD if so designed, and a memory that may be on chip or off chip memory, e.g., memory 320. Accordingly, since an on-chip or off-chip ECD may not support all of the various video codecs or that can decode all various NAL data structures that are received, switching between a fixed hardware decoder and a software decoder provides for advantages described herein, namely fast switching that aids the user experience when limitations of the hardware decoder are encountered. These techniques are applicable to various video coding techniques that may be outside the commonly employed H.264 MPEG standards including, e.g., AVC or scalable video coding (SVC). It should be understood that these video standards are examples only, and other codecs may be employed, e.g., Video Codec-1 (VC-1).

Figure 4A:
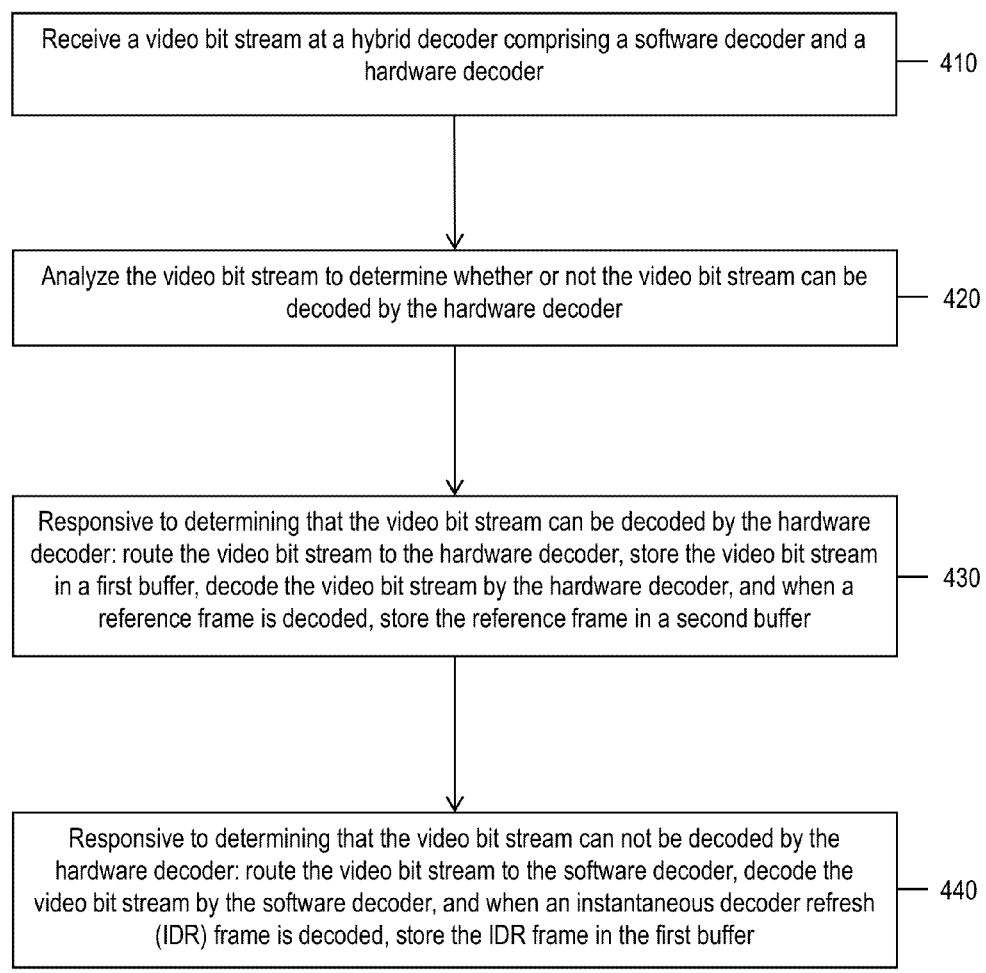
FIG. 4a is an example flow chart depicting a general process for performing fast switching between the hardware decoder and the software decoder.
Figure 4B:
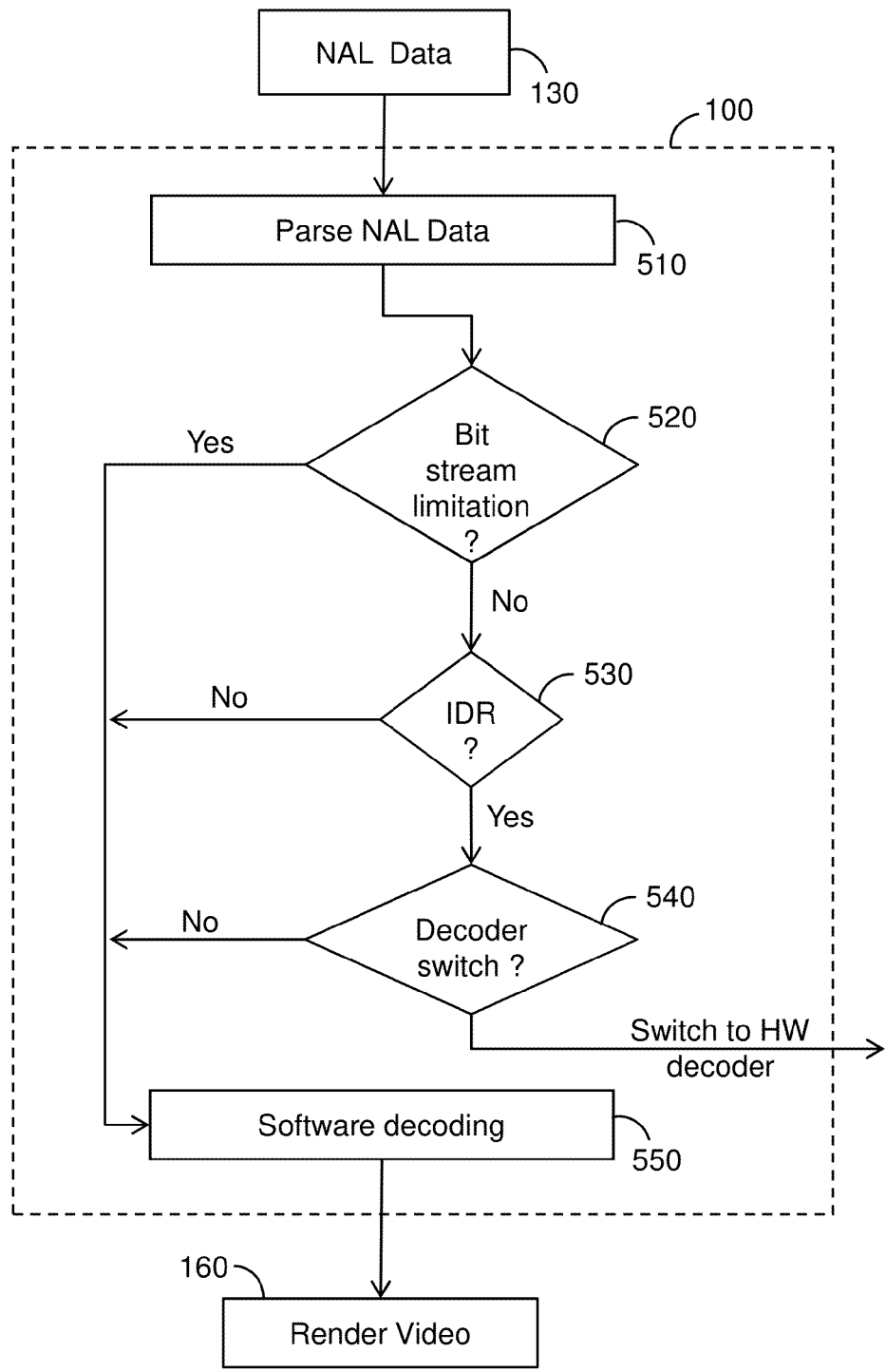
FIG. 4b is an example flow chart depicting in more detail the example operations referred to in connection with FIG. 4a for the software decoder.
Figure 4C:
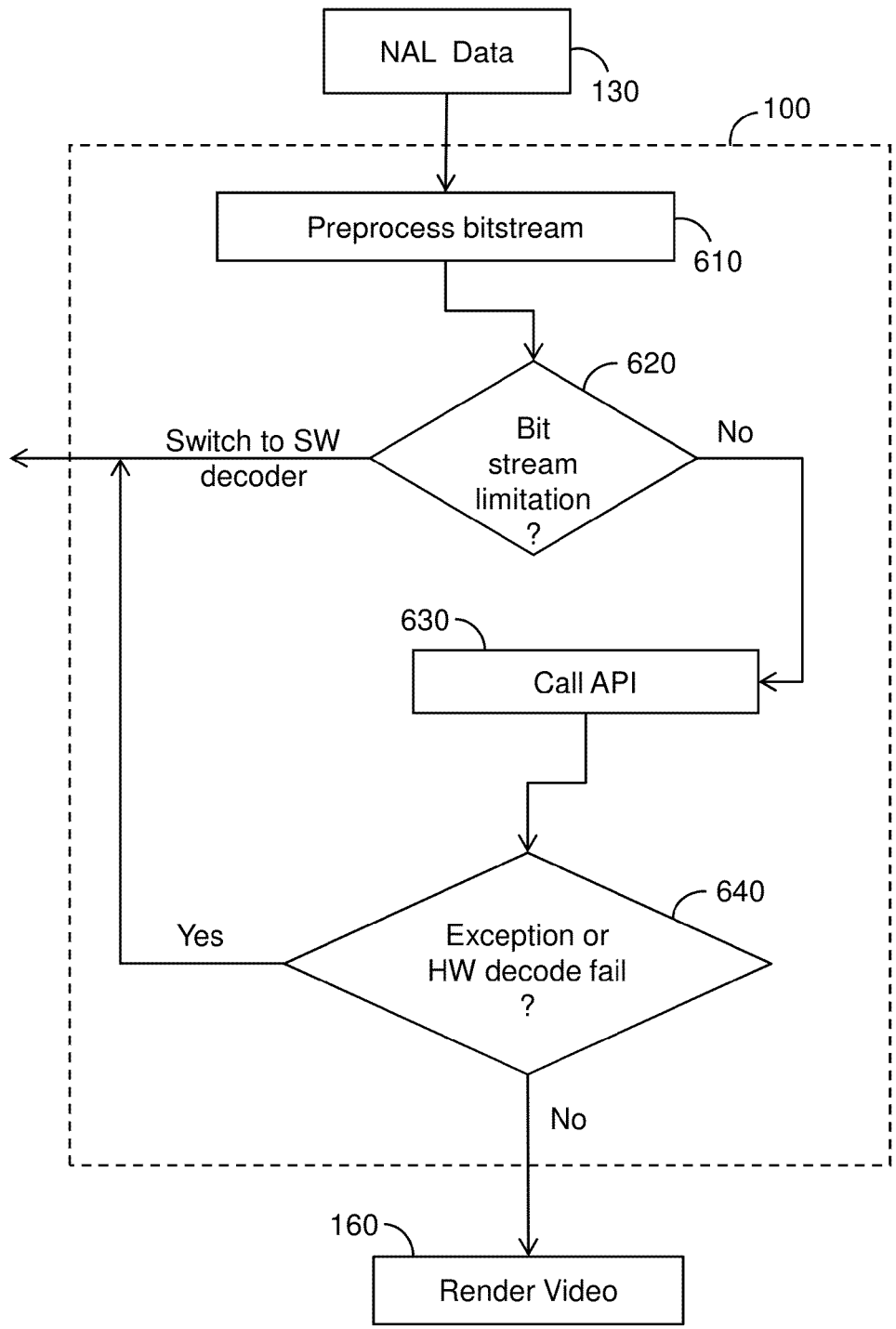
FIG. 4c is an example flow chart depicting in more detail the example operations referred in connection with FIG. 4a for the hardware decoder.

Turning now to FIGS. 4a, 4b, and 4c, software-hardware decoder switching process logic 400 is now described. As shown in FIG. 4a, process 400 is described as a generalized process with respect to both the software decoder and hardware decoder. In FIG. 4b, aspects of the process 400 are described with reference to NAL data sent to the software decoder, e.g., software decoder 110. In FIG. 4c, aspects of the process 400 are described with reference to NAL data sent to the hardware decoder, e.g., hardware decoder 120. These separate descriptions with respect to process 400 are labeled processes 400a, 400b, and 400c, respectively.

Regarding FIG. 4a, at 410, a video bit stream is received at a hybrid decoder comprising a software decoder and a hardware decoder. At 420, the video bit stream is analyzed to determine whether or not the video bit stream can be decoded by the hardware decoder, e.g., hardware decoder 120. At 430, when it is determined that the video bit stream can be decoded by the hardware decoder, the video bit stream is routed to the hardware decoder and also stored in a first buffer. The first buffer may be part of a memory or dedicated buffer, e.g., transfer buffer 140. As the video bit stream is decoded by the hardware decoder, when a reference frame is decoded, the reference frame is stored in a second buffer, e.g., DPB 230 (FIG. 2). At 440, when the video bit stream can not be decoded by the hardware decoder, the video bit stream is routed to the software decoder and decoded by the software decoder, e.g., software decoder 110. When an IDR frame is decoded by the software decoder, the IDR frame is stored in the first buffer, e.g., transfer buffer 140 shown in FIG. 2.

Referring now to FIG. 4b, an example flow chart is now described for more detailed operations generally described above in connection with FIG. 4a for the software decoder. As in the previous examples, NAL data 130 is received by hybrid decoder 100, which is illustrated with a dashed line to indicate that the flowchart depicts a process executed within hybrid decoder 100. At 510, the NAL data is parsed or otherwise analyzed to determine if a bit stream limitation is found. At 520, if a bit stream limitation is found, processing continues with software decoding at 550. At 530, if a bit stream limitation is not found, parsing NAL data further reveals whether or not an IDR frame has been received. If an IDR frames has not been received, then software decoding continues. At 540, if an IDR frame has been received, a switch to the hardware decoder is attempted, otherwise software decoding continues. As described above, video is rendered at 160.

In this example, when the switch to the hardware decoder is attempted, it may not always be successful for a number of reasons. For example, the switch could be rejected by the hardware decoder. The hardware decoder may reject the decoder switch if it is not ready, a proper IDR frame has not been detected in the transfer buffer, or the hardware decoder can not process the switch signal, e.g., an Interrupt Service Routine (ISR) can not be invoked. Although not previously described, a handoff or handshake mechanism may be employed to verify a complete and accepted decoder transfer, otherwise decoding remains with the software decoder.

Referring now to FIG. 4c, an example flow chart is now described for more detailed operations generally described above in connection with FIG. 4a for the hardware decoder. NAL data 130 is received by hybrid decoder 100, which again is illustrated with a dashed outline. At 610, the NAL data is preprocessed or otherwise analyzed to determine if a bit stream limitation is found. At 620, if a bit stream limitation is found, processing switches to software decoding. At 630, if a bit stream limitation is not found, API calls are made in order to decode the NAL data. An example API call may be made via the OpenMAX application-to-hardware API developed by the Khronos Group. APIs allow application developers to concentrate on application development without having to know the details of the underlying hardware, i.e., the APIs allow a degree of hardware independence. At 640, API exceptions or hardware decoder failure is monitored. If an exception or hardware decoder failure is detected, a switch to the software decoder is made, otherwise hardware decoding continues and video is rendered at 160.

The techniques described herein allow for fast switching between a hardware decoder and a software decoder when a hardware decoder limitation is encountered. A video bit stream is received at a hybrid decoder comprising a software decoder and a hardware decoder. The video bit stream is analyzed to determine whether or not the video bit stream can be decoded by the hardware decoder. When it is determined that the video bit stream can be decoded by the hardware decoder, the video bit stream is routed to the hardware decoder and also stored in a first buffer, e.g., transfer buffer 140 (e.g., shown in FIGS. 1 and 2). The video bit stream is decoded by the hardware decoder and when a reference frame is decoded, the reference frame is stored in a second buffer, e.g., DPB 230 (shown in FIG. 2). When the video bit stream can not be decoded by the hardware decoder, the video bit stream is routed to the software decoder and decoded by the software decoder. When an instantaneous decoder refresh (IDR) frame is decoded by the software decoder, the IDR frame is stored in the first buffer. The use of the first and second buffers to store the requisite data allows the hybrid decoder to rapidly switch between the software and hardware decoders based on the contents of the received video bit stream.

If while routing the video bit stream to the hardware decoder it is determined that the video bit stream can not be decoded by the hardware decoder, the software decoder decodes the video bit stream using the contents of the first and second buffers. For example, API error, a hardware exception, or decode fail condition in the hardware decoder may be detected and the video bit stream is routed to the software decoder when the API error, hardware exception, or decode fail condition is detected.

If while routing the video bit stream to the software decoder it is determined that the video bit stream can be decoded by the hardware decoder, the video bit stream is routed to the hardware decoder after an IDR frame is received. Once the video bit stream is routed to the hardware decoder, the hardware decoder can decode the video bit stream using the contents of the first buffer.

To facilitate switching between the two decoders a routing flag, bit, or switch may be employed. When the video bit stream can be decoded by the hardware decoder, a routing flag is set to a first state, e.g., 0 or 1, or "off" or "on," otherwise the routing flag is set to a second state, e.g., a state opposite to that of the first state. Accordingly, the video bit stream is routed to the hardware decoder when the routing flag is set to the first state and routed to the software decoder when the routing flag is set to the second state.

The video bit stream may comprise an NAL that is parsed for parameters that indicate whether or not decoding of the video bit stream is supported by the hardware decoder. The video bit stream may be parsed for a video resolution or resolution ratio that indicates whether or not decoding of the video bit stream is supported by the hardware decoder.

Without the techniques describe herein, e.g., by way of a fast switching hybrid decoder, video rendered by the endpoint application may exhibit delay, distortion, macro blocking, etc.

The above description is intended by way of example only.

What is claimed is:

1. A method comprising:
    receiving a video bit stream at a hybrid decoder comprising a software decoder and a hardware decoder;
    analyzing the video bit stream to determine whether or not the video bit stream can be decoded by the hardware decoder;
    responsive to determining that the video bit stream can be decoded by the hardware decoder while routing the video bit stream to the software decoder, switching decoding from the software decoder to the hardware decoder comprising:
        routing the video bit stream from the software decoder to the hardware decoder;
        storing the video bit stream in a first buffer;
        decoding the video bit stream by the hardware decoder utilizing contents of the first buffer, the first buffer comprising one or more instantaneous decoder refresh (IDR) frames; and
        when a reference frame is decoded, storing the reference frame in a second buffer;
    responsive to determining that the video bit stream can not be decoded by the hardware decoder while routing the video bit stream to the hardware decoder, switching decoding from the hardware decoder to the software decoder comprising:
        routing the video bit stream from the hardware decoder to the software decoder;
        decoding the video bit stream by the software decoder using contents of the first and second buffers, the first buffer comprising the video bit stream and the second buffer comprising one or more reference frames; and
        when an IDR frame is decoded, storing the IDR frame in the first buffer.

2. The method of claim 1, wherein while routing the video bit stream to the hardware decoder, further comprising:
    detecting an application interface (API) error, a hardware exception, or decode fail condition in the hardware decoder; and
    routing the video bit stream to the software decoder when the API error, hardware exception, or decode fail condition is detected.

3. The method of claim 1, further comprising:
    if while routing the video bit stream to the software decoder it is determined that the video bit stream can be decoded by the hardware decoder, routing the video bit stream to the hardware decoder after an IDR frame is received.

4. The method of claim 1, further comprising:
    responsive to determining that the video bit stream can be decoded by the hardware decoder, setting a routing flag to a first state;

responsive to determining that the video bit stream can not be decoded by the hardware decoder, setting the routing flag to a second state; and routing the video bit stream to the hardware decoder when the routing flag is set to the first state and routing the video bit stream to the software decoder when the routing flag is set to the second state.

5. The method of claim 1, wherein the video bit stream comprises a Network Abstraction Layer (NAL) and analyzing comprises parsing the NAL for parameters that indicate whether or not decoding of the video bit stream is supported by the hardware decoder, and responsive to determining the video bit stream can be decoded by the hardware decoder, routing the video bit stream to the hardware decoder and storing the video bit stream in the first buffer.

6. The method of claim 1, wherein analyzing comprises parsing the video bit stream for a video resolution or resolution ratio that indicates whether or not decoding of the video bit stream is supported by the hardware decoder.

7. An apparatus comprising:
a hybrid decoder including a software decoder and a hardware decoder;
a memory having a first and second buffer;
a processor configured to:
receive a video bit stream;
analyze the video bit stream to determine whether or not the video bit stream can be decoded by the hardware decoder;
responsive to determining that the video bit stream can be decoded by the hardware decoder while routing the video bit stream to the software decoder, switch decoding from the software decoder to the hardware decoder by which the processor is configured to:
route the video bit stream from the software decoder to the hardware decoder;
store the video bit stream in the first buffer;
decode the video bit stream by the hardware decoder utilizing contents of the first buffer, the first buffer comprising one or more instantaneous decoder refresh (IDR) frames; and
when a reference frame is decoded, store the reference frame in the second buffer;
responsive to determining that the video bit stream can not be decoded by the hardware decoder while routing the video bit stream to the hardware decoder, switch decoding from the hardware decoder to the software decoder by which the processor is configured to:
route the video bit stream from the hardware decoder to the software decoder;
decode the video bit stream by the software decoder using contents of the first and second buffers, the first buffer comprising the video bit stream and the second buffer comprising one or more reference frames; and
when an IDR frame is decoded, store the IDR frame in the first buffer.

8. The apparatus of claim 7, wherein while routing the video bit stream to the hardware decoder, the processor is configured to:
detect an application interface (API) error, a hardware exception, or decode fail condition in the hardware decoder; and
route the video bit stream to the software decoder when the API error, hardware exception, or decode fail condition is detected.

9. The apparatus of claim 7, wherein if while routing the video bit stream to the software decoder the processor determines that the video bit stream can be decoded by the hardware decoder, the processor is configured to route the video bit stream to the hardware decoder after an IDR frame is received.

10. The apparatus of claim 7, wherein the processor is further configured to:
responsive to determining that the video bit stream can be decoded by the hardware decoder, set a routing flag to a first state;
responsive to determining that the video bit stream can not be decoded by the hardware decoder, set the routing flag to a second state; and
route the video bit stream to the hardware decoder when the routing flag is set to the first state and route the video bit stream to the software decoder when the routing flag is set to the second state.

11. The apparatus of claim 7, wherein the video bit stream comprises a Network Abstraction Layer (NAL) and the processor is configured to parse the NAL for parameters that indicate whether or not the video bit stream can be decoded by the hardware decoder, and responsive to determining the video bit stream can be decoded by the hardware decoder, the processor is configured to route the video bit stream to the hardware decoder and store the video bit stream in the first buffer.

12. The apparatus of claim 7, wherein the processor is configured to parse the video bit stream for a video resolution or resolution ratio that indicates whether or not the video bit stream can be decoded by the hardware decoder.

13. One or more non-transitory computer readable storage media encoded with software comprising computer executable instructions and when the software is executed operable to:
receive a video bit stream at a hybrid decoder comprising a software decoder and a hardware decoder;
analyze the video bit stream to determine whether or not the video bit stream can be decoded by the hardware decoder;
responsive to determining that the video bit stream can be decoded by the hardware decoder while routing the video bit stream to the software decoder, switch decoding from the software decoder to the hardware decoder based on instructions operable to:
route the video bit stream from the software decoder to the hardware decoder;
store the video bit stream in a first buffer;
decode the video bit stream by the hardware decoder utilizing contents of the first buffer, the first buffer comprising one or more instantaneous decoder refresh (IDR) frames; and
when a reference frame is decoded, store the reference frame in a second buffer;
responsive to determining that the video bit stream can not be decoded by the hardware decoder while routing the video bit stream to the hardware decoder, switch decoding from the hardware decoder to the software decoder based on instructions operable to:
route the video bit stream from the hardware decoder to the software decoder;
decode the video bit stream by the software decoder using contents of the first and second buffers, the first buffer comprising the video bit stream and the second buffer comprising one or more reference frames; and
when an IDR frame is decoded, store the IDR frame in the first buffer.

14. The non-transitory computer readable storage media of claim 13, wherein the instructions are further operable to:
   detect an application interface (API) error, a hardware exception, or decode fail condition in the hardware decoder; and
   route the video bit stream to the software decoder when the API error, hardware exception, or decode fail condition is detected.

15. The non-transitory computer readable storage media of claim 13, wherein the instructions are further operable to:
   if while routing the video bit stream to the software decoder it is determined that the video bit stream can be decoded by the hardware decoder, route the video bit stream to the hardware decoder after an IDR frame is received.

16. The non-transitory computer readable storage media of claim 13, wherein the instructions are further operable to:
   responsive to determining that the video bit stream can be decoded by the hardware decoder, set a routing flag to a first state;
   responsive to determining that the video bit stream can not be decoded by the hardware decoder, set the routing flag to a second state; and
   route the video bit stream to the hardware decoder when the routing flag is set to the first state and route the video bit stream to the software decoder when the routing flag is set to the second state.

17. The non-transitory computer readable storage media of claim 13, wherein the video bit stream comprises a Network Abstraction Layer (NAL), and wherein the instructions are further operable to parse the NAL for parameters that indicate whether or not decoding of the video bit stream is supported by the hardware decoder, and responsive to determining the video bit stream can be decoded by the hardware decoder, route the video bit stream to the hardware decoder and store the video bit stream in the first buffer.

18. The non-transitory computer readable storage media of claim 13, wherein the instructions are further operable to parse the video bit stream for a video resolution or resolution ratio that indicates whether or not the video bit stream can be decoded by the hardware decoder.

\* \* \* \* \*